Aug. 21, 1934.   K. W. PALMAER ET AL   1,970,974
METHOD OF PURIFYING MERCURY USED AS CATHODE IN ELECTROLYZING PROCESSES
Filed April 20, 1932
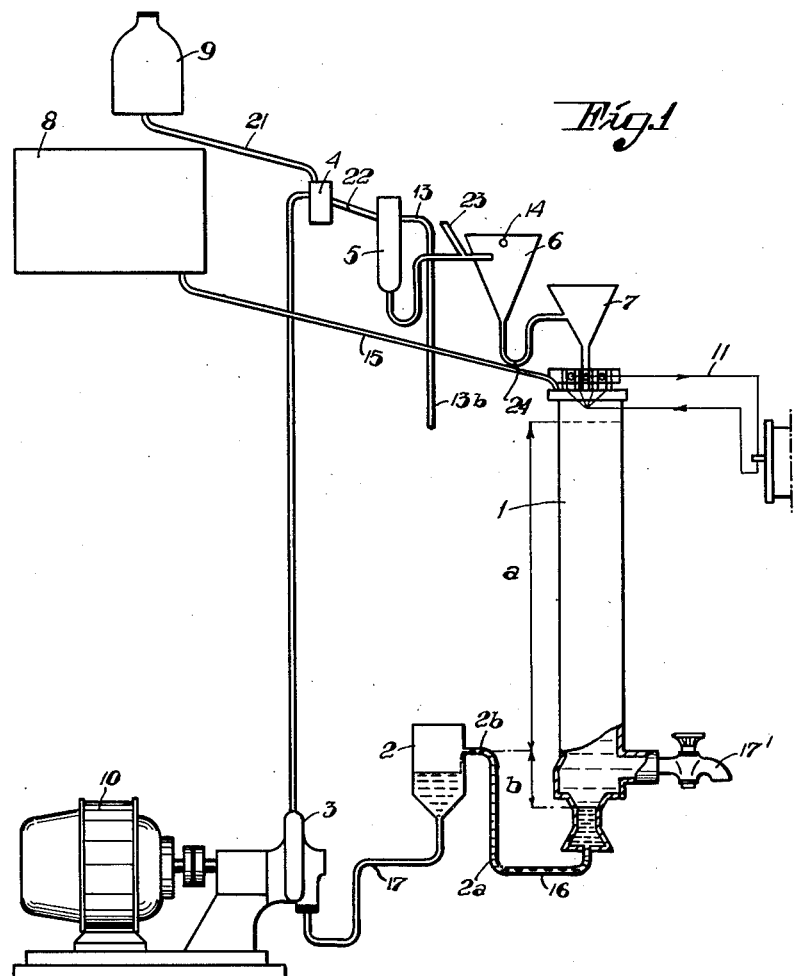
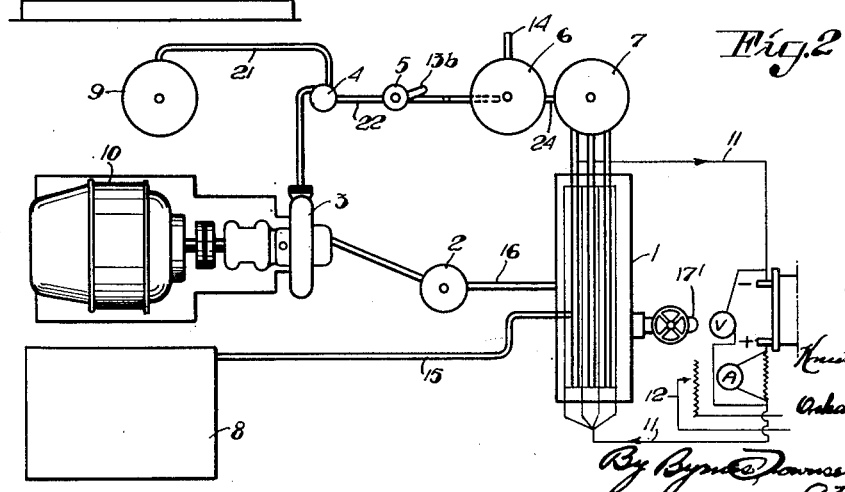

Patented Aug. 21, 1934

1,970,974

UNITED STATES PATENT OFFICE 1,970,974

METHOD OF PURIFYING MERCURY USED AS CATHODE IN ELECTROLYZING PROCESSES

Knut Wilhelm Palmaer, Stockholm, and Oskar Emanuel Griep, Äppelviken, Sweden; said Griep assignor to said Palmaer Application April 20, 1932, Serial No. 606,462
In Sweden April 30, 1931

11 Claims. (Cl. 204—1)

In the art of removing by electrolysis one or more of the metals of the eighth group of the periodic system from solutions containing salts of said metals sometimes a mercury body is used as cathode. In such processes it is obviously a condition for economical working that the cathode mercury which is contaminated by deposited metals taken up therein is purified continuously or intermittently, for then again to be returned into the electrolytic cell.

It has been established by experience that this purification must be effected under certain conditions in order to obtain a good result. The method according to the invention which relates to improvements in the electrolytical deposition of one or more of said metals from solutions containing salts thereof while using a cathode of mercury which is purified after the electrolyzing operation and then returned to the electrolytic cell, is mainly characterized by the feature of purifying the mercury used for the electrolyzing operation from metal or metals taken up therein, in such a way that the mercury itself is not attacked during the purification. To this end it is possible either to use a substance, which is indifferent to mercury, e. g. mercurous salts, preferably in solution, or the purifying process may be effected so as to remove only part of the total quantity of contaminating metal or metals present in the mercury. For reasons which will be explained in the following such a partial removal involves advantages also if a substance indifferent to mercury, e. g. a mercurous salt solution, is used as a purifying agent. Accordingly the purifying agent in both cases is preferably used in quantities less than equivalent to the quantity of metal which has been taken up in the mercury. Preferably the conditions during the purification of the mercury are regulated so that only such quantity or approximately such quantity of metal is removed from the mercury as was taken up by said mercury during the electrolysis. In the electrolysis care should preferably be taken that the percentage of deposited metal or metals in the mercury used as cathode is kept constant or substantially constant at a value not higher than 0,5%, preferably lower than 0,3%.

The reasons why an attack on the mercury during the purification should be avoided are the following.

An attack on the mercury means firstly that mercury is converted from the metallic state into a compound. If this compound is not recovered loss of mercury occurs. If the compound is recovered (e. g. by decantation or filtration, if insoluble; by precipitation followed by decantation or filtration if said compound is soluble) loss of mercury may be avoided but on the other hand more or less expensive processes for recovering the mercury will be necessitated.

Attack by the purifying agent on the mercury, however, often results in a considerably more serious draw-back.

If the mercury is attacked so that a slightly soluble or an insoluble compound (oxide or slightly soluble salts) is formed it easily happens that the mercury body disintegrates into small drops, the surface of which is covered by the formed compound. These drops recombine extremely slowly. It is obvious that mercury in such a form is unsuitable or unuseful as cathode material.

One method of effecting the purification so as to avoid attacks on the mercury consists, as previously mentioned, in using as a purifying agent a substance which is indifferent to mercury, such as mercurous salts, preferably in solution. If, on the other hand, a purifying agent is used, which is capable of attacking mercury, also, this attack is avoided by carrying out the purification so that only part of the metal or metals taken up in the mercury during the electrolysis is removed. This can be explained by the following illustrative example.

The normal potential of iron is —0.43 volt, and the normal potential of mercury is about +0.8 volt. Iron is thus less noble than mercury in a degree which, expressed by the difference between the normal potentials, amounts to approximately 1.2 volt. This means that, other things being equal, as for instance the kind, concentration, temperature of the solution used, iron is attacked (for instance is dissolved) much more readily than mercury. Accordingly if a mixture of iron and mercury is treated with a substance capable of attacking both these metals the first one of them to be attacked (dissolved out) is iron. Only when the iron has been practically completely consumed, the mercury is attacked. Consequently, if the quantity of the attacking substance is regulated with respect to the iron-mercury mixture so that the attacking substance is consumed before all the iron in the mercury has reacted with the substance, there will be no attack on the mercury. It is preferable, also when using a purifying agent which is indifferent to mercury, to carry out the purifying process in such a way that only part of the quantity of metal or metals taken up in the mercury is removed, since the purifying agent in this way may be more completely utilized.

In certain cases, as for instance electrolyzing processes where cathode mercury is caused to flow at such a rate that the deposited metal is completely removed by the mercury in amalgamated form without apeparing as a film or coating on the cathode surface at the current density used, it is preferable for reasons which will be given in the following that during the purification of the mercury the conditions are so regulated that only such quantity or approximately such quantity of metal is removed from the mercury as was taken up by said mercury during the electrolysis. Preferably the percentage of deposited metal in the mercury used as cathode is kept constant and at a value not exceeding 0.5%, preferably lower than 0.3%. If the removal of the metals of the eighth group from mercury is effected continuously in such a way that the mercury flows through a purifying vessel at the same rate as through the electrolytic cell, and if purifying agent is supplied to the purifying vessel at a certain rate $x$, care should obviously be taken that the rate $x$ will not become too low. This is so for the reason that if the rate $x$ becomes too low the amount of deposited metal or metals in the mercury will increase, and by and by it will attain such a value that the circulation of the cathode mercury is rendered impossible or difficult due to the fact that the mercury has become too viscous. On the other hand the rate $x$ must not be too great, since in such a case the percentage of the metal or metals in question in said mercury will fall, until finally the mercury is beginning to be attacked (if there is used a purifying agent which is capable of attacking mercury). The rate $x$ should obviously be regulated so that the percentage in the mercury of incorporated metal is kept at a value approximately right between the point at which the inconvenience relating to the circulation begins to appear, and that point where the attack on the mercury of the purifying agent starts. The margin of safety is then equal in both directions. A percentage of about 0.1 to 0.2% of metal in the mercury has been found suitable. If the percentage of metal in the mercury exceeds 0.5% serious inconveniences are met with, the mercury becoming so viscous that it can be caused to flow only with the greatest difficulty.

One method of removing one or more of the metals, iron, cobalt and nickel from such contaminated cathode mercury as is obtained in the electrolytic removal of said metals from solutions containing salts thereof consists in reacting an oxidizing agent with the mercury containing the metal or metals. To dissolve for instance iron out of mercury by means of a non-oxidizing acid only is not possible, as this would mean that iron were dissolved with the development of hydrogen, for instance according to the equation:

$$Fe + H_2SO_4 = FeSO_4 + H_2$$

In order to deposit hydrogen on mercury from an 1-normal acid solution a voltage of about 0.8 volt is required, whereas the normal potential of iron is only —0.43 volt. Already at a concentration of ferrous ions as low as $10^{-12}$-normal the iron accordingly loses its power to deposit hydrogen on mercury from an 1-normal acid solution, and it is consequently practically impossible to dissolve iron out of mercury by means of for instance sulphuric acid only, in the way illustrated by the above equation.

If, however, a suitable oxidizing agent is present, this acts as a depolarizer for the hydrogen and the dissolving out of the metals taken up in the mercury becomes possible. Iron may for instance be dissolved according to the equation $$Fe + H_2SO_4 + H_2O_2 = FeSO_4 + 2H_2O.$$

What has been stated above with respect to iron applies also to cobalt and nickel.

The purifying agent should preferably be of such a nature that it can be readily regenerated, i. e. if it is an oxidizing agent it should have the property of being readily reoxidized. For such reasons one or more of the following substances is/are preferred: ferric salts, e. g. ferric sulphate or ferric chloride, hydrochlorites, nitric acid or nitrates, preferably in aqueous solution. Of course also when using oxidizers as purifying agent that rule is to be observed that only part of the total quantity of metal in the mercury should be removed before the mercury is returned to the electrolytic cell, because otherwise the oxidizing agent will attack the mercury. Hence it is preferable to keep the amount of the oxidizing agent below that which is equivalent to the quantity of metal taken up in the mercury. According to one embodiment of the invention the conditions during the purification of the mercury by means of oxidizing agents are regulated so as to remove only such quantity or approximately such quantity of metal from the mercury as was taken up by said mercury during the electrolysis. When an aqueous solution of oxidizing agent is used the solution should be kept acid in order to aid the reaction between the oxidizing agent and the metal/metals present in the mercury. For economical reasons the consumed oxidizing agent should be re-oxidized and re-utilized. Also where the purification is effected by means of oxidizing agents the percentage of deposited metal in the mercury used as cathode may be kept at a constant or approximately constant value, not exceeding 0.5% but preferably being lower than 0.3%.

A suitable device for carrying out the method according to the invention will be described in the following with reference to the attached drawing in which Fig. 1 is a side elevation and Fig. 2 a plan of an installation according to the invention.

The electrolysis is carried out in the cell 1 which comprises a number of cathodes consisting of mercury flowing over suitable bearers or supports, as well as a corresponding number of anodes. The cathodes and anodes are connected to the current conductors 11 which are, in their turn, connected to a suitable current generator. V and A designate a voltmeter and an amperemeter respectively. 12 is an adjustable resistance for regulating the current. The solution to be electrolyzed is conveyed, preferably in a heated state, from the container 8 through the pipe 15 to the electrolytic cell 1. The liquid introduced through the pipe 15 is subjected to electrolysis in the electrolytic cell, the deposited metals being taken up and carried away in amalgamated state by the flowing cathode mercury. The lower portion of the electrolytic cell is connected with one end of a U-tube 16, the other end of which opens out into a vessel 2. The contaminated cathode mercury flows off through this U-tube. The level on which one shank of the tube 16 is joined to the vessel 2 is taken so that the column of mercury of the height $b$ in the tube 16 is sufficient, according to the law of communicating vessels, to counter-balance the column of electrolyte of the height $a+b$ in the cell 1. Hence, no electrolyte will flow off together with mercury through the tube 16, and the whole quantity of electrolyte may be drawn off through the cock 17' after the electrolysis has been finished. The idea is thus that the electrolytic cell communicates with a mercury trap $2^a$ with overflow $2^b$, in which trap there is a mercury column of such a height that the hydrostatic pressure prevailing in the electrolytic cell is counter-balanced by said mercury column so as to permit the continuous flow-off of mercury out of the cell without accompanying electrolyte.

From the vessel 2 the mercury flows through a pipe 17 to a centrifugal pump 3 driven by an electromotor 10, which pump raises the mercury to the purifying vessel 4. The mercury is continuously pumped up into the purifying vessel 4. Purifying liquid is introduced—preferably also continuously—into this vessel through a pipe 21 from a container 9. This liquid contains in solution or suspension an agent which is capable of removing metal taken up by the cathode mercury. Thus, for instance, a solution of ferric sulphate may be used. During the purification the kinetic energy of the mercury admitted into the vessel 4 is utilized to effect a sufficient mixing of mercury and the liquid containing the purifying agent. Trials have shown that the mixing brought about in this way is very effective. The effect may be increased by making the purifying vessel 4 with a circular cross-section, the mercury being introduced in a tangential direction as shown in Fig. 2.

From the purifying vessel 4 the mixture of mercury and purifying agent flows to one widened shank of a U-tube 5. This shank is provided with an overflow 13 where the liquid containing consumed purifying agent flows off and is conveyed through the conduit $13^b$ to a container or the like where it may be regenerated if desired, and from which it may be returned to the vessel 4. Through the other shank of the U-tube mercury is discharged to a washing vessel 6. The last-mentioned shank opens out into the washing vessel 6 on such a level that the mercury column in this shank counter-balances the liquid column in the other widened shank according to the law of communicating vessels so that the mercury passing to the vessel 6 will not be accompanied by any appreciable quantity of purifying liquid. In front of the inlet of the washing vessel 6 wash water is introduced by a branch pipe 23 and is mixed with mercury so as to remove the last traces of purifying liquid. The wash water and the mercury are separated in the vessel 6 due to their different specific gravities. The mercury sinks to the bottom and passes on through the U-shaped conduit 24 to the collector vessel 7 from which it is introduced into the electrolytic cell. The wash water flows off through the overflow 14. Also here the law of communicating vessels is applied, the U-shaped conduit 24 acting as a mercury trap so that no wash water goes with the mercury into the collector vessel 7.

As set forth hereinbefore the mercury circulates and is purified continuously during the process. It is obvious, however, that the purification may be effected intermittently instead of continuously.

What we claim is:—

1. In a process of removing metals of the iron group from solutions containing salts of such metals by electrolyzing such solutions with a mercury cathode, removing the contaminated mercury from the cell, removing metals taken up by the mercury in said electrolyzing process from said mercury by means of a purifying agent and returning the purified mercury to the cell, the improvement which comprises using the purifying agent in a quantity which is less than that equivalent to the contaminating metal present in the mercury so as to remove only a portion of said contaminating metal.

2. A process as defined in claim 1, wherein the contaminating metal is removed from the mercury by the action of a mercury salt.

3. A process as defined in claim 5, wherein only such a quantity of contaminating metal is removed from the mercury as is taken up by the mercury in passing through the electrolytic cell.

4. A process as defined in claim 1, wherein the quantity of contaminating metal present in the mercury after the purification is kept at an approximately constant value not exceeding about 0.5%.

5. In a process of removing iron, nickel and cobalt from solutions containing salts of such metals by electrolyzing such solutions with a mercury cathode, removing the contaminated mercury from the cell, removing metals taken up by the mercury in said electrolyzing process from said mercury by means of a purifying agent and returning the purified mercury to the cell, the improvement which comprises using as purifying agent an oxidizing agent in a quantity less than equivalent to the contaminating metal present in the mercury so as to remove only a portion of said contaminating metal.

6. A process as defined in claim 5, wherein the oxidizing agent is so selected that it may be readily reoxidized.

7. A process as defined in claim 5, wherein the oxidizing agent is a ferric salt.

8. A process as defined in claim 5, wherein only such a quantity of contaminating metal is removed from the mercury as is taken up by the mercury in passing through the electrolytic cell.

9. A process as defined in claim 5, wherein the quantity of contaminating metal present in the mercury after the purification is kept at an approximately constant value not exceeding about 0.5%.

10. A process as defined in claim 5, wherein the cathode mercury is purified by means of an aqueous solution of an oxidizing agent maintained in an acid condition.

11. A process as defined in claim 5, wherein the oxidizing agent consumed in the purification is reoxidized and used for further purification.

KNUT WILHELM PALMAER.
OSKAR EMANUEL GRIEP.